United States Patent [19]

Baiborodov et al.

[11] 3,723,267

[45] Mar. 27, 1973

[54] METHOD OF PRODUCING HIGH PURITY ANTIMONY FROM ANTIMONY TRIOXIDE OBTAINED BY BURNING REFINED METAL

[75] Inventors: Pavel Petrovich Baiborodov, Tashkent; Alexandra Vasilievna Uvarova; Ivan Konstantinovich Gerasimov, both of Oshskaya oblast; Alexandr Borisovich Ezhkov, Tashkentskaya oblast Almalyk; Nikolai Arkadievich Kolbin, Oshskaya oblast, all of U.S.S.R.

[73] Assignee: Sredneaziatsky Nauchno-Isseldovatelsky I. Proektny Institut Tsvetnoi Metallurgii, Tashkentaskaya ablast, U.S.S.R.

[22] Filed: Jan. 5, 1971

[21] Appl. No.: 104,168

[52] U.S. Cl. ..................................204/105 R, 75/121
[51] Int. Cl. ................................................C22d 1/00
[58] Field of Search ............204/105 R, 45 A; 75/121

[56] References Cited

UNITED STATES PATENTS 2,817,628   12/1957   Breining et al. .....................204/45 A

FOREIGN PATENTS OR APPLICATIONS 736,928   6/1966   Canada............................204/105 R

OTHER PUBLICATIONS

Handbook of Chemistry and Physics, 32nd ed., 1950, by The Chemical Rubber Publishing Co., pages 456–457.

*Primary Examiner*—John H. Mack
*Assistant Examiner*—R. L. Andrews
*Attorney*—Waters, Roditi, Schwartz & Nissen

[57] ABSTRACT

A method of producing antimony having a total amount of impurities of not higher than 0.01 percent which comprises treating antimony trioxide with an aqueous alkaline solution of glycerine to obtain a solution enriched in antimony and subjecting the solution to electrolysis whereby high-purity antimony is electrodeposited on a cathode.

This method makes possible an increase in the extraction of high purity antimony by as much as 30 percent.

8 Claims, No Drawings

METHOD OF PRODUCING HIGH PURITY ANTIMONY FROM ANTIMONY TRIOXIDE OBTAINED BY BURNING REFINED METAL

The present invention relates to methods of producing high-purity antimony from antimony trioxide obtained by burning refined metal.

The method proposed in the present invention envisages the production of high-purity metallic antimony with the total amount of impurities of not over 0.01 percent, from antimony trioxide containing 99.9 percent of antimony.

In a well known method of producing high-purity antimony from antimony trioxide obtained by burning refined metal, antimony trioxide is dissolved in a solution of hydrochloric acid, and then hydrolysis is carried out in the resulting solution. The hydrolysis results in the precipitation of high-purity antimony trioxide from the solution. The resultant precipitated antimony trioxide is then washed to remove residues of hydrochloric acid, dehydrated, dried during 15–18 hours at a temperature of 100°–100°C, and subjected to reduction smelting.

In the reduction smelting process sugar is used as a reducing agent, and anhydrous sodium carbonate as a flux. The resultant metal is remelted to be purified from sodium. The purified metal is cast into graphite molds, then cooled ingots are pickled with hydrochloric acid and directed to zone melting.

In the process of zone melting the metal is purified from a number of admixtures, such as copper, iron, lead, etc., which are made to accumulate in one end of the ingot. This end of the ingot is broken off, and the remaining portion of the ingot, equal to approximately 60 percent of its initial length and containing 99.99 percent of antimony is delivered to the user.

The known method involves a relatively great number of operations, some of which, such as drying and zone melting, require a rather considerable time for their accomplishment. The extraction of antimony is not higher than 60 percent. The consumption of electric power along is about 100 kw per kg of the desired product.

It is an object of the present invention to eliminate the above-mentioned difficulties.

The specific object of the invention is to provide a method of producing high-purity antimony from antimony trioxide obtained by burning refined metal, which would make it possible to obviate the stages of drying purified antimony trioxide, as well as reduction smelting and zone melting, by making recourse to electrolysis.

According to the invention, said specific object is accomplished by treating antimony trioxide with an aqueous-alkaline solution of glycerine, and by electrolyzing the resulting solution thus enriched in antimony.

The antimony trioxide completely passes into the solution, forming a glycerate complex, and in a small amount of the undissolved residue there remains a portion of admixtures, containing, mainly, tin, zinc, copper, and nickel.

When carrying out the process of dissolution, it is expedient that the quantity of glycerine dissolved in the aqueous-alkaline solution should be four to six times in excess of the quantity of alkali dissolved therein. The dissolution proves to proceed most effectively when the concentration of glycerine in the solution is 250–300 grams per liter (g/l), and that of alkali is 50–80 g/l.

The operation of dissolving antimony trioxide should be carried out at a temperature of 60°–70°C, with stirring, over a period of 30–40 minutes.

The process of electrolysis should be carried out in an electrolytic cell made of a vinyl plastic or other material which is inert in alkaline media, provided with anodes made from maximum pure graphite and with cathodes made from high-purity antimony.

The current density during the electrolysis may amount to 300–500 A per sq. m and over, provided that this does not involve additional difficulties with cooling of the electrolyte.

The electrolysis is carried out till the concentration of antimony in the solution becomes not lower than 60–80 g/l, whereupon the depleted solution is corrected with respect to the content of alkali and glycerine therein and directed to the dissolution of new batches of antimony trioxide.

The metal obtained as a result of the electrolysis is a powder containing, after washing and drying, more than 99.9 percent of antimony. Such metal may be delivered to the user either directly, or as an ingot with a mirror surface, obtained by melting said powder in the atmosphere of an inert gas.

In case initial antimony trioxide contains an increased content of arsenic (more than 0.02 percent), it is reasonable to effect its preliminary purification from arsenic. For this purpose antimony trioxide should be treated with diluted nitric acid at a temperature of 70°–80C under stirring. After settling, the solution is decanted, the antimony trioxide is washed with water, and then taken over to be dissolved in aqueous-alkaline solutions of glycerine.

An essential advantage of the present method resides in that the extraction of high-purity antimony is enhanced by at least 30 percent, as compared with the known method, the consumption of electric power alone being reduced by 60 percent.

Given hereinbelow is a detailed description of an example illustrating the accomplishment of the present method.

As a stock material use was made of antimony trioxide obtained by burning refined metal containing 99.9 percent of antimony.

The antimony trioxide featured 0.005 percent of arsenic and 0.003 percent of iron.

This antimony trioxide product was purified from arsenic by treating it with diluted nitric acid having a concentration of 70 g/l. The washing was carried out under stirring in a porcelain reactor heated with steam, at a temperature of 70°C, during 1 hour. After the washing, more than 70 percent of arsenic contained in the antimony trioxide passed into the solution.

After the precipitation the solution was decanted, and the residue of the antimony trioxide was washed with hot water to remove nitric acid.

The washed antimony trioxide was directed to be dissolved in an aqueous-alkaline solution comprising 250 g/l of glycerine and 60 g/l of caustic soda. The dissolution was carried out in a porcelain reactor of 50 liter capacity, equipped with a stirrer made of plastic.

The process of dissolution was carried out at a temperature of 60°C during half an hour. The resulting solution enriched in antimony contained 103 g/l of antimony. The solution was filtered with the help of a vacuum-filter and sent to be electrolyzed in a bath made of plastic inert to the alkaline medium. The bath of 50 liter capacity was equipped with graphite anodes and with cathodes made of high-purity antimony. The space between the similar electrodes was 60 mm. The solution was continuously fed into the bath and discharged therefrom at an average rate of 1.5 liter per min. The average current intensity was 155.6 A, average cathode current density was 317.5 A per sq. m, average anode current density was 344.7 A per sq. m, voltage across the bath was 3.97 V, and the electrolyte temperature was 43.4°C. The electrolysis was carried out till the content of antimony in the solution reached 60–80 g/l.

The solution discharged from the bath was corrected till the content of glycerine and caustic soda therein reached the initial value, and then it was used for dissolving new batches of antimony trioxide.

The deposited antimony was periodically removed from the cathode as a powder, which was then washed for effecting complete removal of glycerine.

The material delivered to the user was either in the form of dried powder, or in the form of metal ingots produced from said powder. In the latter case, for the ingot to have a mirror surface, the metal was remelted in graphite moulds under argon.

The amount of antimony in the final product was always over 99.99 percent. The average percenage of admixtures was as follows: iron, $3.10^{-4}$; copper, $5.10^{-5}$; arsenic, $5.10^{-4}$; lead, less than $6.10^{-4}$; nickel, less than $2.10^{-4}$; gold, $2.10^{-5}$; bismuth, less than $1.10^{-5}$; tin, less than $1.10^{-4}$; silicon, $5.10^{-4}$; aluminum, less than $2.10^{-4}$; phosphorus, $1.10^{-4}$. No traces of silver, cobalt or zinc were revealed by spectral analysis.

The extraction of high-purity antimony was 95.7 percent. The specific consumption of electric power, caustic soda and glycerine per kg of high-purity antimony 2.81 kwh, 0.44 kg and 0.17 kg, respectively.

What is claimed is:

1. A method of producing high-purity antimony comprising treating antimony trioxide containing 0.1 percent maximum of impurities with an aqueous-alkaline solution of glycerine, and then subjecting the resultant antimony-enriched solution to electrolysis in order to effect high-purity antimony deposition on the cathode.

2. A method of claim 1 wherein the aqueous-alkaline solution of glycerine contains 250 to 300 grams of glycerine per liter and 50 to 80 grams of caustic soda per liter.

3. A method of claim 1 wherein said antimony trioxide is treated with the aqueous-alkaline solution of glycerine at a temperature of 60° to 70°C with stirring for a period of from 30 to 40 minutes.

4. A method of claim 1 wherein the process of electrolysis is conducted in an electrolytic cell made of an alkaline medium-resisting material and having anodes manufactured from pure graphite and cathodes manufactured from high-purity antimony or graphite.

5. A method of claim 4 wherein the process of electrolysis is conducted in an electrolyte having an antimony concentration of about 60 grams per liter minimum.

6. A method of claim 1 wherein the process of electrolysis is conducted at a cathode current density of 300 to 500 A/sq.m.

7. A method of claim 1 wherein the antimony trioxide, in which the content of arsenic exceeds 0.01 percent, is pre-treated with dilute nitric acid at a temperature of 70° to 80°C with stirring, followed by allowing the sediment to settle, decanting the arsenic-containing solution, washing the antimony trioxide sediment with water, and subjecting the resulting arsenic-free antimony trioxide to said treatment.

8. In a method of recovering the high-purity antimony from antimony trioxide containing about 99.9 percent antimony obtained by burning refined metal, the steps comprising treating said antimony trioxide with an aqueous-alkaline solution of glycerine to obtain a solution enriched in antimony, separating the resultant solution, and subjecting said solution to electrolysis in a cell provided with pure graphite anodes and high purity antimony cathodes to effect the deposition on the cathode and recovering high purity antimony.

* * * * *